US010865557B2

(12) United States Patent
Guo et al.

(10) Patent No.: US 10,865,557 B2
(45) Date of Patent: Dec. 15, 2020

(54) PRESTRESSED ASSEMBLED CONCRETE FRAME-JOINT CONNECTING STRUCTURE AND CONSTRUCTING METHOD THEREOF

(71) Applicants: CHINA STATE CONSTRUCTION ENGINEERING CORPORATION LIMITED, Beijing (CN); China State Construction Academy Corporation Limited, Beijing (CN)

(72) Inventors: Haishan Guo, Beijing (CN); Hu Qi, Beijing (CN); Kang Liu, Beijing (CN); Dongyan Wang, Beijing (CN); Liming Li, Beijing (CN); Lida Tian, Beijing (CN); Jiao Geng, Beijing (CN); Ming Li, Beijing (CN); Haitao Zhang, Beijing (CN); Tong Li, Beijing (CN); Xiaojie Yang, Beijing (CN); Xin Fan, Beijing (CN); Xueying Hou, Beijing (CN); Tao Zeng, Beijing (CN); Lihong Jiang, Beijing (CN)

(*) Notice: Subject to any disclaimer, the term of this patent is extended or adjusted under 35 U.S.C. 154(b) by 0 days.

(21) Appl. No.: 16/724,332

(22) Filed: Dec. 22, 2019

(65) Prior Publication Data
US 2020/0141110 A1    May 7, 2020

Related U.S. Application Data

(63) Continuation of application No. PCT/CN2018/088161, filed on May 24, 2018.

(30) Foreign Application Priority Data

Jun. 22, 2017   (CN) .......................... 2017 1 0482150

(51) Int. Cl.
*E04B 1/21* (2006.01)
*E04B 1/22* (2006.01)
(Continued)

(52) U.S. Cl.
CPC .................. *E04B 1/22* (2013.01); *E04B 1/21* (2013.01); *E04B 1/215* (2013.01); *E04B 1/5831* (2013.01);
(Continued)

(58) Field of Classification Search
CPC ... E04B 1/20; E04B 1/21; E04B 1/215; E04B 1/22; E04B 1/58; E04B 1/5831; E04C 3/26; E04H 9/021; E04G 21/12
See application file for complete search history.

(56) References Cited

U.S. PATENT DOCUMENTS 3,613,325 A * 10/1971  Yee ........................... E04B 1/20
                                                                52/236.8
10,378,197 B2 * 8/2019  Kurosawa ................ E04B 5/29
(Continued)

FOREIGN PATENT DOCUMENTS

| CN | 201738455 U | 2/2011 |
|---|---|---|
| CN | 103924677 A | 7/2014 |

(Continued)

OTHER PUBLICATIONS

Internatinal Search Report of PCT/CN2018/088161, dated Jun. 29, 2018.

*Primary Examiner* — Ryan D Kwiecinski
(74) *Attorney, Agent, or Firm* — W&K IP (57) ABSTRACT

The present disclosure relates to the technical field of assembled concrete frame structures, and discloses a prestressed assembled concrete frame-joint connecting structure and constructing method thereof. The present disclosure includes a prefabricated concrete column, a prefabricated concrete superposed beam, a composite slab, a post-tensioned prestressing tendon that connects the prefabricated concrete column and the prefabricated concrete superposed
(Continued)

beam, a bending-resistant energy consuming steel bar and a shearing-resistant high-strength steel bar.

9 Claims, 5 Drawing Sheets

(51) Int. Cl.
 *E04C 3/26* (2006.01)
 *E04H 9/02* (2006.01)
 *E04B 1/58* (2006.01)
 *E04G 21/12* (2006.01)

(52) U.S. Cl.
 CPC ............... *E04C 3/26* (2013.01); *E04G 21/12* (2013.01); *E04B 1/58* (2013.01); *E04H 9/021* (2013.01)

(56) References Cited

U.S. PATENT DOCUMENTS

| 2018/0320363 | A1* | 11/2018 | Hong | ...................... E04B 1/215 |
| 2019/0078315 | A1* | 3/2019 | Tazarv | ...................... E04H 9/02 |
| 2020/0131755 | A1* | 4/2020 | Nitunga | ................ E04B 1/2604 |

FOREIGN PATENT DOCUMENTS

| CN | 106499051 A | | 3/2017 | | |
| CN | 107165272 A | | 9/2017 | | |
| CN | 207194146 U | | 4/2018 | | |
| DE | 2720042 A1 | * | 12/1977 | ............... | E04B 1/21 |
| DE | 19952594 A1 | * | 5/2001 | ............ | E04B 1/215 |
| JP | 2002309669 A | | 10/2002 | | |
| JP | 2012046960 A | | 3/2012 | | |
| KR | 101520002 B1 | * | 5/2015 | ............ | E04B 1/215 |
| WO | WO-2014118713 A1 | * | 8/2014 | ............ | E04B 1/215 |
| WO | WO-2017187452 A1 | * | 11/2017 | ............ | E04H 9/025 |

* cited by examiner

PRESTRESSED ASSEMBLED CONCRETE FRAME-JOINT CONNECTING STRUCTURE AND CONSTRUCTING METHOD THEREOF

CROSS-REFERENCE TO RELATED APPLICATIONS

This application is a continuation of International Patent Application No. PCT/CN2018/088161 with a filing date of May 24, 2018, designating the United States, now pending, and further claims priority to Chinese Patent Application No. 201710482150.4 with a filing date of Jun. 22, 2017. The content of the aforementioned applications, including any intervening amendments thereto, are incorporated herein by reference.

TECHNICAL FIELD

The present disclosure relates to the technical field of assembled concrete frame structures, and particularly relates to a prestressed assembled concrete frame-joint connecting structure and constructing method thereof.

BACKGROUND

Assembled concrete-frame-structure systems are extensively applied due to their advantages such as a high constructing speed and good social environment benefit, and their earthquake-resistant performances are mainly decided by the connection joints between the prefabricated parts.

Currently, in China assembled concrete-frame-structure systems mainly employ two modes. One is of half dry type, wherein the beam and the column are disconnected at the joint connection, the members of the beam and the column are prefabricated by sections, and the area of the connection joint of the beam and the column is in-site poured at the construction site to form an assembled monolithic structural system. The constructing of such a connecting structure of joint is complicated and difficult. The other is of dry type, and in mainly applied to the structures of factory buildings, wherein a corbel for supporting a prefabricated beam is provided on a prefabricated column, and the prefabricated column and the prefabricated beam are connected by welding steel-plate embedded parts or inserting a steel bar. Such a connecting structure of joint has a poor capacity of transmitting beam-end bending moments, and the joint has a poor earthquake-resistant performance.

Regarding the dry-type connection joints of assembled concrete-frame-structure systems, in the United States and Japan no corbel is provided, and when they are applied to civilian constructions, generally there are the following modes. One is providing energy consuming steel bars at both of the upper portion and the lower portion of the beam, wherein although this mode has a good energy consumption capacity in large-magnitude earthquakes, it results in complicated constructing of the joint; especially, the energy consuming steel bar at the lower portion of the beam cannot be conveniently installed. Another is connecting the beam and the column merely by using a post-tensioned prestressing steel bar, wherein such a structure has a poor energy consumption performance in large-magnitude earthquakes, and the earthquake-resistant performance is not ideal. Another is leaving a hole at the upper portion of the prefabricated beam, and providing an energy consuming steel bar within the hole. That mode requires to provide a constructing slot having a large length on the beam for laying the energy consuming steel bar in site, whereby the constructing process is complicated and difficult. Moreover, the energy consuming steel bars serve simultaneously as the shear resistant steel bars, require a large quantity in use, and are difficult to be laid within the prefabricated cross section. Furthermore, the anchoring lengths that are within side columns are frequently insufficient, which results in that such a joint has a poor shear resistant performance and, especially when the prestressing tendon has failure, the joint has a poor capacity of resisting continuous collapse. Although such a dry-type connection joint has less in-site wet operation, the integrality of the slabs of the structure is poor, and the performance of waterproofing between the floors cannot be ensured.

SUMMARY

The present disclosure provides a prestressed assembled concrete frame-joint connecting structure and constructing method thereof that can be efficiently constructed, has good earthquake-resistant performance and capacity of resisting continuous collapse, and facilitates post-earthquake repairing.

The technical problems to be solved are: the constructing processes of the conventional half-dried assembled concrete-frame-structure connection joints are complicated and difficult, those of the dried connection joints are difficult, and the obtained structures have a poor integrality and a poor earthquake-resistant performance.

In order to solve the above technical problems, the present disclosure employs the following technical solutions:

The prestressed assembled concrete frame-joint connecting structure of the present disclosure comprises a prefabricated concrete column, a concrete superposed beam and a composite slab, wherein the prestressed assembled concrete frame-joint connecting structure further comprises a temporary support and a post-tensioned prestressing tendon that are provided under the joint, a bending-resistant energy consuming steel bar and a shearing-resistant high-strength steel bar, wherein the post-tensioned prestressing tendon connects the prefabricated concrete column and the prefabricated concrete superposed beam; a beam post-poured layer of the prefabricated concrete superposed beam and a slab post-poured layer of the composite slab are integrally poured; a beam-column seam between the prefabricated concrete superposed beam and the prefabricated concrete column is filled with a high-strength crack pouring binding material; and the bending-resistant energy consuming steel bar and the shearing-resistant high-strength steel bar are laid into the beam post-poured layer at an upper portion of the prefabricated concrete superposed beam, and the bending-resistant energy consuming steel bar is located over the shearing-resistant high-strength steel bar.

In the prestressed assembled concrete frame-joint connecting structure of the present disclosure, optionally, the prefabricated concrete superposed beam comprises a prefabricated beam at a lower portion and the beam post-poured layer at the upper portion, a beam prestressing-tendon channel is provided within a range of ⅓ from a middle portion to a lower portion of a cross section of the prefabricated beam and in a length direction throughout a length of the prefabricated beam; the prefabricated concrete column is provided with horizontally a column prestressing-tendon channel, and the column prestressing-tendon channel matches with and corresponds to the beam prestressing-tendon channel; the post-tensioned prestressing tendon passes through sequentially the beam prestressing-tendon channel and the column prestressing-tendon channel, and tensions and fastens the beam and the column by using a prestressing-tendon outer anchor head; and column prestressing-tendon channels that are not in a same straight line are staggered in a column height direction.

In the prestressed assembled concrete frame-joint connecting structure of the present disclosure, optionally, a width of the beam-column seam between the prefabricated concrete superposed beam and the prefabricated concrete column is 10-30 mm.

In the prestressed assembled concrete frame-joint connecting structure of the present disclosure, optionally, the high-strength crack pouring binding material is one or more of a high-strength quick-hardening-cement-based grouting material, a fiber quick-hardening-cement-based grouting material or a polymer mortar material that have a compressive strength above 45 MPa.

In the prestressed assembled concrete frame-joint connecting structure of the present disclosure, optionally, the shearing-resistant high-strength steel bar has one end that protrudes into the prefabricated concrete column and is connected to an internal-to-column anchoring steel bar via a mechanical-connection connector, and one end that is poured within the beam post-poured layer, and a length of the shearing-resistant high-strength steel bar that is poured within the beam post-poured layer is not less than 15 times a diameter of a steel bar.

In the prestressed assembled concrete frame-joint connecting structure of the present disclosure, optionally, the bending-resistant energy consuming steel bar is provided internal to the column and is in a form of no adhesion, an energy-consuming-steel-bar channel is provided horizontal within the prefabricated concrete column, and the bending-resistant energy consuming steel bar passes through the energy-consuming-steel-bar channel, and has one end that protrudes out of an outer side of the prefabricated concrete column and is connected to the prefabricated concrete column via an external-to-column anchoring plate, and the other end that is poured within the beam post-poured layer.

In the prestressed assembled concrete frame-joint connecting structure of the present disclosure, optionally, the bending-resistant energy consuming steel bar is provided external to the column and is in a form of partial adhesion, and the bending-resistant energy consuming steel bar has one end that protrudes into the prefabricated concrete column and is connected to an internal-to-column anchoring steel bar via a mechanical-connection connector, and the other end that is poured within the beam post-poured layer; the bending-resistant energy consuming steel bar is nested by a sleeve, the sleeve has one end that clings to an outer side wall of the prefabricated concrete column, and a length of the sleeve is 4-23 times a diameter of the bending-resistant energy consuming steel bar; and the bending-resistant energy consuming steel bar within the sleeve is a necking section, the necking section has a cross-sectional area of 50-90% of a cross-sectional area of the bending-resistant energy consuming steel bar, and the necking section extends from a position that has a distance to the mechanical-connection connector of 1-3 times the diameter of the bending-resistant energy consuming steel bar to a tail end of the sleeve.

In the prestressed assembled concrete frame-joint connecting structure of the present disclosure, optionally, a cross-sectional shape of the necking section is round or an unusual shape, the unusual shape is formed by combining two mutually parallel straight lines and two symmetrical circular arcs, a radius of a circle where the circular arcs are in is equal to a radius of the bending-resistant energy consuming steel bar, and a central angle of the circular arcs is 50-70°.

In the prestressed assembled concrete frame-joint connecting structure of the present disclosure, optionally, the bending-resistant energy consuming steel bar is provided external to the column and is in a form of full adhesion, and the bending-resistant energy consuming steel bar has one end that protrudes into the prefabricated concrete column and is connected to an internal-to-column anchoring steel bar via a mechanical-connection connector, and the other end that is poured within the beam post-poured layer.

The method for constructing the prestressed assembled concrete frame-joint connecting structure of the present disclosure comprises the following steps:

Step 1: installing the temporary support: according to a design scheme, installing the temporary support on the prefabricated concrete column;

Step 2: installing the prefabricated concrete column: in a hoisting process, adjusting a perpendicularity of the prefabricated concrete column by using the temporary support;

Step 3: installing the concrete superposed beam: hoisting the prefabricated beam, and fixing the prefabricated beam over the temporary support;

Step 4: installing the composite slab: hoisting a prefabricated slab of the composite slab, and fixing the prefabricated slab to the prefabricated beam;

Step 5: installing the post-tensioned prestressing tendon: laying the post-tensioned prestressing tendon into the prefabricated concrete column and the prefabricated beam of the prefabricated concrete superposed beam;

Step 6: filling the beam-column seam: filling the high-strength crack pouring binding material into the beam-column seam between the prefabricated concrete superposed beam and the prefabricated concrete column, wherein a width of the beam-column seam is 10-30 mm;

Step 7: tensioning the post-tensioned prestressing tendon: after the binding material within the beam-column seam has reached a required strength, tensioning the post-tensioned prestressing tendon, and fixing;

Step 8: laying the bending-resistant energy consuming steel bar and the shearing-resistant high-strength steel bar: laying the bending-resistant energy consuming steel bar and the shearing-resistant high-strength steel bar at a position of the prefabricated concrete superposed beam where the beam post-poured layer is to be poured, and connecting one end of the bending-resistant energy consuming steel bar and one end of the shearing-resistant high-strength steel bar to the prefabricated concrete column; and Step 9: pouring the post-poured layers: integrally pouring the beam post-poured layer of the prefabricated concrete superposed beam and the slab post-poured layer of the composite slab in site, and after the poured concrete structure has reached a required strength, performing maintenance.

As compared with the prior art, the prestressed assembled concrete frame-joint connecting structure of the present disclosure has the following advantageous effects:

The prestressed assembled concrete frame-joint connecting structure of the present disclosure uses the prefabricated concrete superposed beam and the composite slab, and the post-poured layers are integrally poured with the bending-resistant energy consuming steel bar and the shearing-resistant high-strength steel bar to pour them therewithin, to form one piece, which improves the integrality of the structure, ensures a good water resistance performance of the building, facilitates the providing of the steel bars mounted later, and greatly reduces the difficulty of constructing. The linear prestressing-tendon channels are provided throughout the lengths of the prefabricated beam and the prefabricated column, the post-tensioned prestressing tendon passes through them, and the post-tensioned prestressing tendon may employ the form of adhesion or no adhesion, and combines with the bending-resistant energy consuming steel bar and the shearing-resistant high-strength steel bar in the above, to connect the beam and the column, to form a complete stress bearing system, which effectively improves the energy consumption property of the structure, and enhances the earthquake-resistant performance and the capacity of resisting continuous collapse of the structure.

When the bending-resistant energy consuming steel bar of the present disclosure employs the external-to-column partial adhesion form, the sleeve is employed to realize the partial adhesion, and the bending-resistant energy consuming steel bar within the sleeve is provided with the necking section, whereby the yield of the steel bar at the upper portion concentrates in the no-adhesion necking section, which ensures that the part out of the no-adhesion necking section where the steel bar and the concrete are adhered does not have yield failure, thereby reducing the damage to the steel bar and the concrete out of the necking section. Moreover, the uniform distribution of deformation in the steel-bar necking section can also ensure that the necking section is not damaged due to deformation that is excessively concentrated.

The upper portion of the cross section of the joint of the present disclosure is at the same time provided with the bending-resistant energy consuming steel bar and the shearing-resistant high-strength steel bar. The shearing-resistant high-strength steel bar improves the shear resistance of the joint, which ensures that when the prestressing tendon has failure the joint still has a good shear resistance, thereby improving the capacity of resisting continuous collapse of the structure. Moreover, regular steel bars at the lower portion of the joint are eliminated, which improves the convenience for constructing of the joint.

The constructing method of the present disclosure is simple and easy to operate. The temporary support is provided on the prefabricated concrete column in advance, the prefabricated beam and the superposed beam are supported at the constructing stage, then the post-tensioned prestressing tendon passes through the prestressing-tendon channels that are left within the prefabricated beam and the prefabricated column, the gap between the beam and the column is filled, and the prestressing tendon is tensioned, to preliminarily form a stable bearing system. The prefabricated slabs of the two composite slabs that are lap-jointed over the prefabricated beam leave a slot therebetween for the beam post-poured layer to be poured, in which the bending-resistant energy consuming steel bar and the shearing-resistant high-strength steel bar can be directly laid, which avoids providing a constructing slot in the beam, thereby greatly reducing the constructing difficulty and the constructing workload, improving the constructing efficiency, and shortening the constructing period.

The prestressed assembled concrete frame-joint connecting structure and constructing method thereof will be described below in further details by referring to the drawings.

REFERENCE NUMBERS

1—prefabricated concrete column; 2—prefabricated concrete superposed beam; 21—prefabricated beam; 22—beam post-poured layer; 3—composite slab; 31—prefabricated slab; 32—slab post-poured layer; 4—temporary support; 5—post-tensioned prestressing tendon; 51—column prestressing-tendon channel; 52—beam prestressing-tendon channel; 53—prestressing-tendon outer anchor head; 6—bending-resistant energy consuming steel bar; 61—energy-consuming-steel-bar channel; 62—external-to-column anchoring plate; 63—sleeve; 64—necking section; 7—shearing-resistant high-strength steel bar; 8—high-strength crack pouring binding material; 91—internal-to-column anchoring steel bar; 92—mechanical-connection connector; and 93—energy-consuming-steel-bar internal-to-column anchoring plate.

DETAILED DESCRIPTION

The First Embodiment

Figure 1:
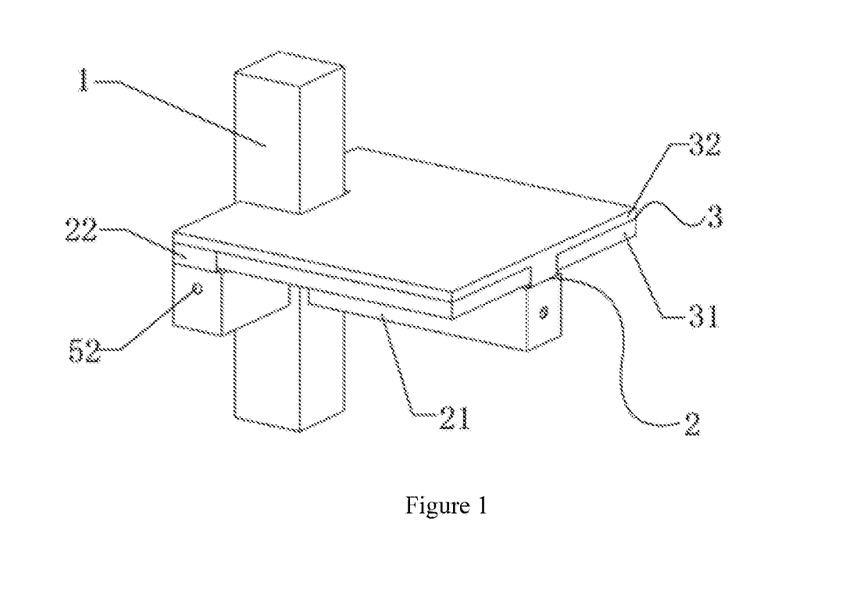
FIG. 1 is a schematic structural diagram of the prestressed assembled concrete frame-joint connecting structures of the first embodiment and the third embodiment.
Figure 2:
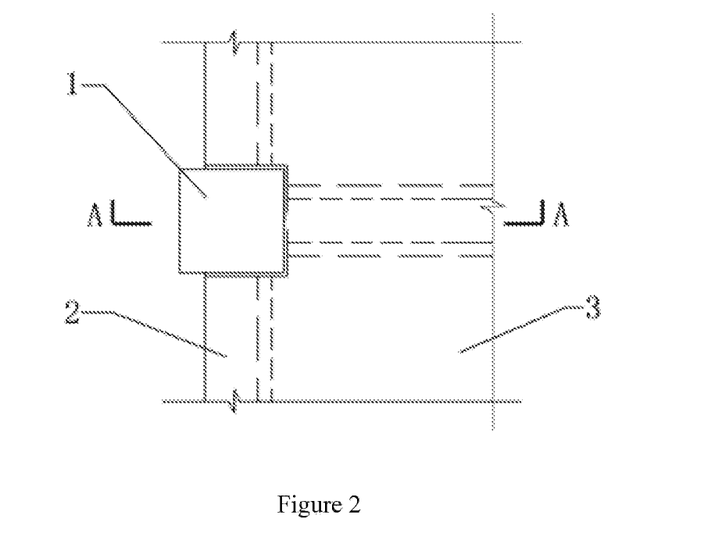
FIG. 2 is a top view of the prestressed assembled concrete frame-joint connecting structures of the first embodiment and the third embodiment.
Figure 3:
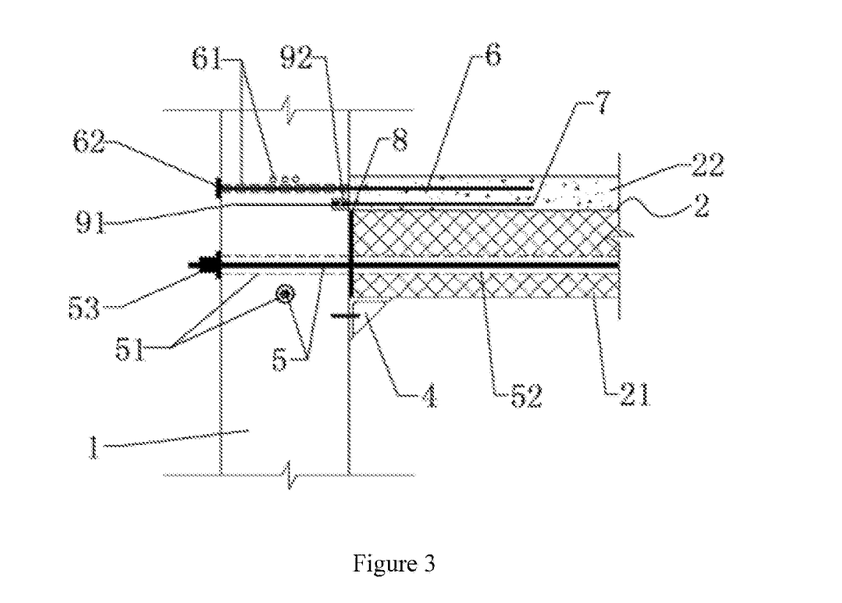
FIG. 3 is a schematic diagram of the A-A cross section in FIG. 2 of the first embodiment.

As shown in FIGS. 1 to 3, the prestressed assembled concrete frame-joint connecting structure of the present disclosure comprises a prefabricated concrete column 1, a prefabricated concrete superposed beam 2, a composite slab 3, a post-tensioned prestressing tendon 5 that connects the prefabricated concrete column 1 and the prefabricated concrete superposed beam 2, and a bending-resistant energy consuming steel bar 6 and a shearing-resistant high-strength steel bar 7 that are located at a post-poured layer at the upper portion of the prefabricated concrete superposed beam 2. The beam post-poured layer 22 of the prefabricated concrete superposed beam 2 and the slab post-poured layer 32 of the composite slab 3 are integrally poured. The prefabricated concrete column 1 is a side column. The side wall of the prefabricated concrete column 1 is provided with a temporary support 4, the temporary support 4 is a corbel, and the opposite side supports the beam bottom of the prefabricated concrete superposed beam 2.

As shown in FIG. 1, the prefabricated concrete superposed beam 2 comprises a prefabricated beam 21 at the lower portion and the beam post-poured layer 22 at the upper portion. A beam prestressing-tendon channel 52 is provided within the range of ⅓ from the middle portion to the lower portion of the cross section of the prefabricated beam 21 and in the length direction throughout the length of the prefabricated beam 21. The prefabricated concrete column 1 is provided with horizontally a column prestressing-tendon channel 51, and the column prestressing-tendon channel 51 matches with and corresponds to the beam prestressing-tendon channel 52. Column prestressing-tendon channels 51 that are not in the same straight line are staggered in the column height direction. The post-tensioned prestressing tendon 5 passes through sequentially the beam prestressing-tendon channel 52 and the column prestressing-tendon channel 51, and tensions and fastens the beam and the column by using a prestressing-tendon outer anchor head 53. The width of the beam-column seam between the prefabricated concrete superposed beam 2 and the prefabricated concrete column 1 is 10-30 mm. It is filled with a high-strength crack pouring binding material 8. The high-strength crack pouring binding material 8 is a high-strength quick-hardening-cement-based grouting material, a steel-fiber quick-hardening-cement-based grouting material or a polymer mortar that have a compressive strength above 45 MPa. As shown in FIG. 3, the bending-resistant energy consuming steel bar 6 is provided internal to the column and is in the form of no adhesion. An energy-consuming-steel-bar channel 61 is provided horizontal over the column prestressing-tendon channel 51. The bending-resistant energy consuming steel bar 6 passes through the energy-consuming-steel-bar channel 61, and has one end that protrudes out of the outer side of the prefabricated concrete column 1 and is connected to the prefabricated concrete column 1 via an external-to-column anchoring plate 62, and the other end that is poured within the beam post-poured layer 22. The bending-resistant energy consuming steel bar 6 and the external-to-column anchoring plate 62 are connected by welding or mechanically.

The shearing-resistant high-strength steel bar 7 is located under the bending-resistant energy consuming steel bar 6, is poured within the beam post-poured layer 22, and has one end that protrudes into the prefabricated concrete column 1 and is connected to an internal-to-column anchoring steel bar 91 via a mechanical-connection connector 92. The length of the shearing-resistant high-strength steel bar 7 that is poured within the beam post-poured layer 22 is not less than 15 times the diameter of a steel bar. The shearing-resistant high-strength steel bar 7 is made of HRB400, HRB500 or HRB600.

The method for constructing the prestressed assembled concrete frame-joint connecting structure of the present disclosure comprises the following constructing steps:

Step 1: installing the temporary support: according to the design scheme, installing the temporary support 4 on the prefabricated concrete column 1, wherein the top face of the temporary support 4 is required to support the beam bottom of the prefabricated concrete superposed beam 2 to be installed;

Step 2: installing the prefabricated concrete column: in a hoisting process, adjusting the perpendicularity of the prefabricated concrete column 1 by using the temporary support 4;

Step 3: installing the prefabricated concrete superposed beam 2: hoisting the prefabricated beam 21, placing it over the temporary support 4, and temporarily fixing;

Step 4: installing the composite slab 3: hoisting a prefabricated slab 31 of the composite slab 3, and fixing the prefabricated slab 31 to the prefabricated beam 21;

Step 5: installing the post-tensioned prestressing tendon: passing the post-tensioned prestressing tendon 5 through sequentially the column prestressing-tendon channel 51 and the beam prestressing-tendon channel 52;

Step 6: filling the beam-column seam: filling the high-strength crack pouring binding material 8 into the beam-column seam between the prefabricated concrete superposed beam 2 and the prefabricated concrete column 1, wherein the width of the beam-column seam is 10-30 mm;

Step 7: tensioning the post-tensioned prestressing tendon: after the binding material within the beam-column seam has reached the required strength, tensioning the post-tensioned prestressing tendon 5 by using the prestressing-tendon outer anchor head 53, and fixing;

Step 8: laying the bending-resistant energy consuming steel bar 6 and the shearing-resistant high-strength steel bar: one end of the shearing-resistant high-strength steel bar 7 protruding into the prefabricated concrete column 1 and connecting to an internal-to-column anchoring steel bar 91 via a mechanical-connection connector 92, and the other end being laid at a position over the prefabricated beam 21 where the beam post-poured layer 22 is to be poured; and one end of the bending-resistant energy consuming steel bar 6 passing through the energy-consuming-steel-bar channel 61 on the prefabricated concrete column 1, protruding out of the prefabricated concrete column 1, and connecting to the prefabricated concrete column 1 by using the external-to-column anchoring plate 62, and the other end being laid at a position over the shearing-resistant high-strength steel bar 7 where the beam post-poured layer 22 is to be poured; and Step 9: pouring the post-poured layers: integrally pouring the beam post-poured layer 22 of the prefabricated concrete superposed beam 2 and the slab post-poured layer 32 of the composite slab 3 in site, and after the poured concrete structure has reached a required strength, performing maintenance.

The Second Embodiment

As shown in FIGS. 4 to 9, the prestressed assembled concrete frame-joint connecting structure of the present disclosure comprises a prefabricated concrete column 1, a prefabricated concrete superposed beam 2, a composite slab 3, a post-tensioned prestressing tendon 5 that connects the prefabricated concrete column 1 and the prefabricated concrete superposed beam 2, and a bending-resistant energy consuming steel bar 6 and a shearing-resistant high-strength steel bar 7 that are located at a post-poured layer at the upper portion of the prefabricated concrete superposed beam 2. The beam post-poured layer 22 of the prefabricated concrete superposed beam 2 and the slab post-poured layer 32 of the composite slab 3 are integrally poured. The prefabricated concrete column 1 is a middle column. The side wall of the prefabricated concrete column 1 is provided with a temporary support 4, the temporary support 4 is a corbel, and the opposite side supports the beam bottom of the prefabricated concrete superposed beam 2.

Figure 4:
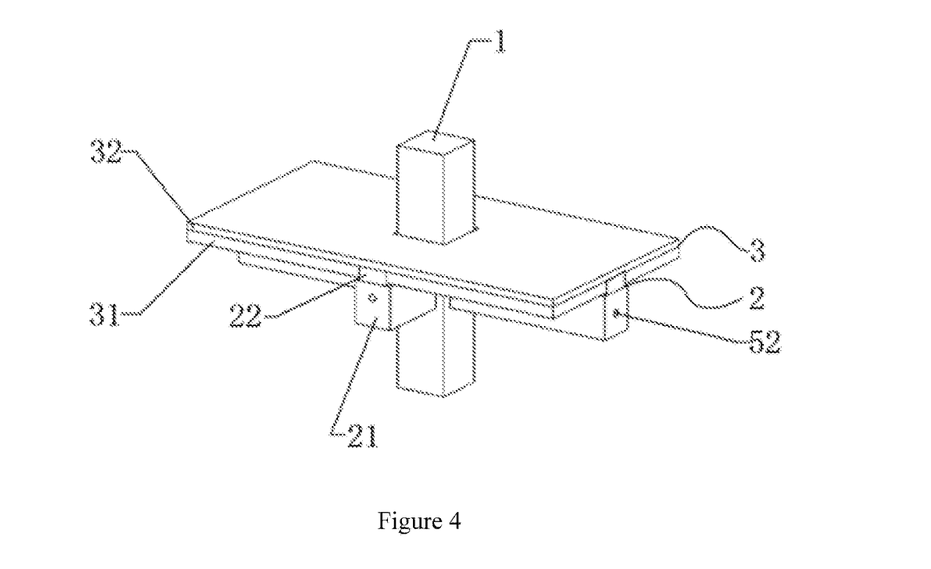
FIG. 4 is a schematic structural diagram of the prestressed assembled concrete frame-joint connecting structure of the second embodiment.
Figure 5:
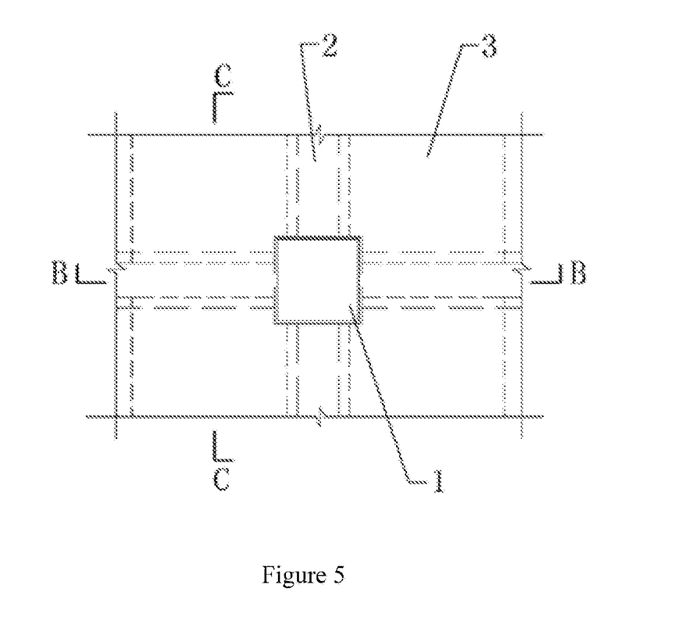
FIG. 5 is a top view of the prestressed assembled concrete frame-joint connecting structure of the second embodiment.
Figure 6:
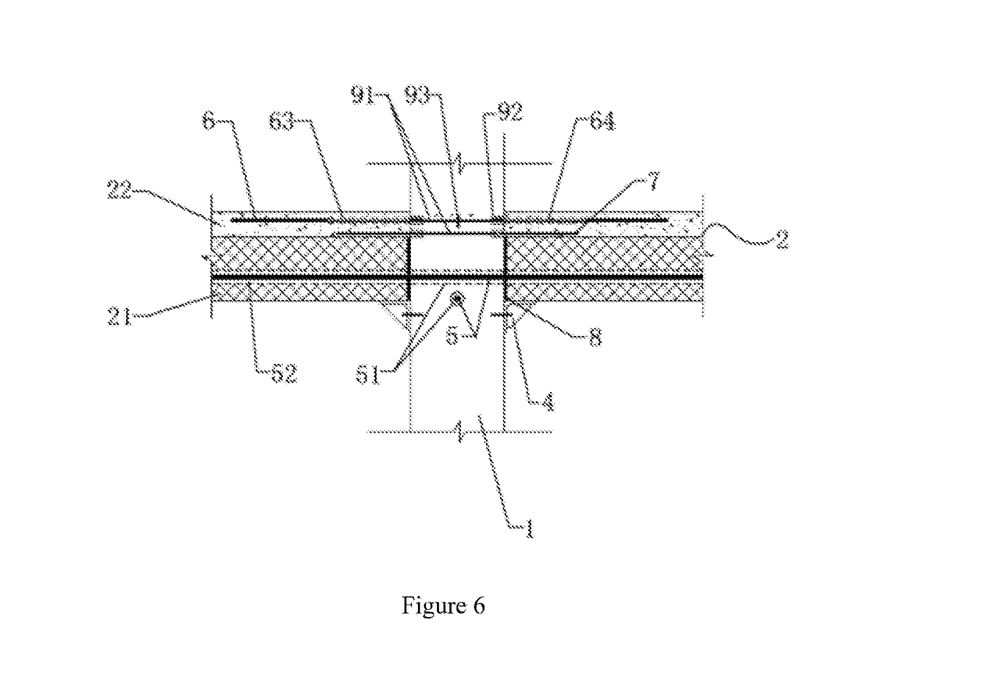
FIG. 6 is a schematic diagram of the B-B cross section in FIG. 5.

As shown in FIGS. 4 and 6, the prefabricated concrete superposed beam 2 comprises a prefabricated beam 21 at the lower portion and the beam post-poured layer 22 at the upper portion. A beam prestressing-tendon channel 52 is provided within the range of ⅓ from the middle portion to the lower portion of the cross section of the prefabricated beam 21 and in the length direction throughout the length of the prefabricated beam 21. The prefabricated concrete column 1 is provided with horizontally a column prestressing-tendon channel 51, and the column prestressing-tendon channel 51 matches with and corresponds to the beam prestressing-tendon channel 52. Column prestressing-tendon channels 51 that are not in the same straight line are staggered in the column height direction. The post-tensioned prestressing tendon 5 passes through sequentially the beam prestressing-tendon channel 52 and the column prestressing-tendon channel 51, and tensions and fastens the beam and the column by using a prestressing-tendon outer anchor head 53. The width of the beam-column seam between the prefabricated concrete superposed beam 2 and the prefabricated concrete column 1 is 10-30 mm. It is filled with a high-strength crack pouring binding material 8. The high-strength crack pouring binding material 8 is a high-strength quick-hardening-cement-based grouting material, a carbon-fiber quick-hardening-cement-based grouting material or a polymer mortar that have a compressive strength above 45 MPa.

Figure 7:
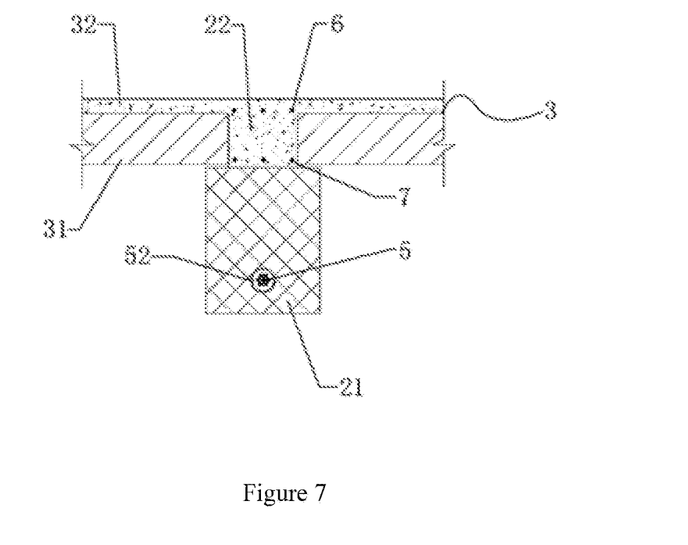
FIG. 7 is a schematic diagram of the C-C cross section in FIG. 5.
Figure 8:
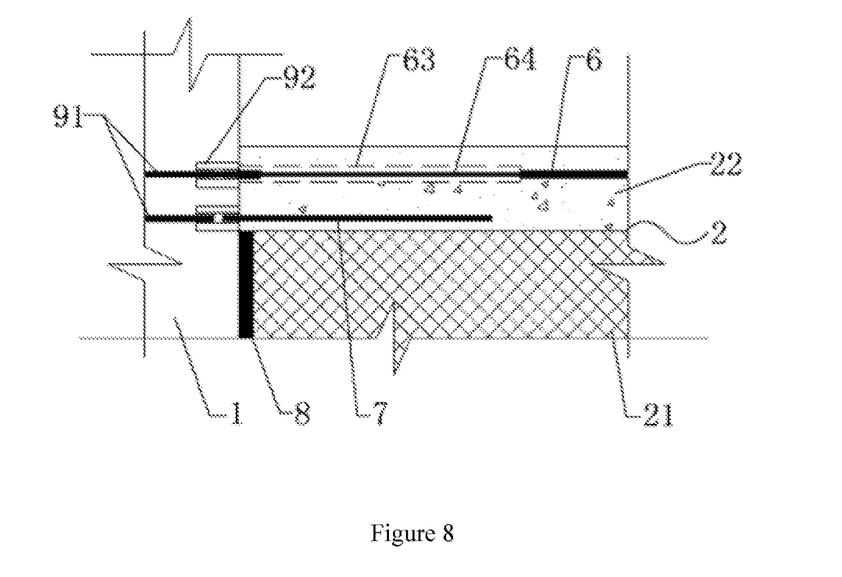
FIG. 8 is a schematic structural diagram of the details of the necking section of the second embodiment.
Figure 9:
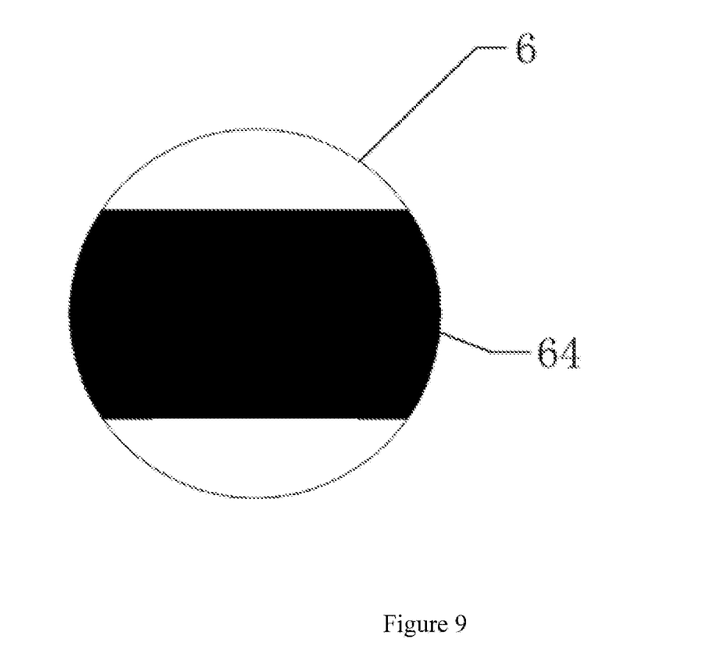
FIG. 9 is a schematic diagram of the cross section of the necking section of the second embodiment.

As shown in FIGS. 6 and 7, the bending-resistant energy consuming steel bar 6 is provided external to the column and is in the form of partial adhesion, and has one end that protrudes into the prefabricated concrete column 1 and is connected to an internal-to-column anchoring steel bar 91 via a mechanical-connection connector 92. The bending-resistant energy consuming steel bar 6 is nested by a sleeve 63. The sleeve 63 has one end that clings to the outer side wall of the prefabricated concrete column 1. The length of the sleeve 63 is 4-23 times the diameter of the bending-resistant energy consuming steel bar 6. The other end of the bending-resistant energy consuming steel bar 6 is poured within the beam post-poured layer 22. The internal-to-column anchoring steel bar 91 is provided with an energy-consuming-steel-bar internal-to-column anchoring plate 93. As shown in FIG. 8, the bending-resistant energy consuming steel bar 6 within the sleeve 63 is a necking section 64. The necking section 64 has a cross-sectional area of 50-90% of the cross-sectional area of the bending-resistant energy consuming steel bar 6. The necking section 64 extends from a position that has a distance to the mechanical-connection connector 92 of 1-3 times the diameter of the bending-resistant energy consuming steel bar 6 to a tail end of the sleeve 63. The cross-sectional shape of the necking section 64 is round or an unusual shape. As shown in FIG. 9, the unusual shape is formed by combining two mutually parallel straight lines and two symmetrical circular arcs, the radius of the circle where the circular arcs are in is equal to the radius of the bending-resistant energy consuming steel bar 6, and the central angle of the circular arcs is 50-70°.

The shearing-resistant high-strength steel bar 7 is located under the bending-resistant energy consuming steel bar 6, is poured within the beam post-poured layer 22, and has one end that protrudes into the prefabricated concrete column 1 and is connected to an internal-to-column anchoring steel bar 91 via a mechanical-connection connector 92. The length of the shearing-resistant high-strength steel bar 7 that is poured within the beam post-poured layer 22 is not less than 15 times the diameter of a steel bar. The shearing-resistant high-strength steel bar 7 is made of HRB400, HRB500 or HRB600.

The method for constructing the prestressed assembled concrete frame-joint connecting structure of the present embodiment is similar to that of the first embodiment, and the difference is the Step 8. The particular method is as follows:

Step 8: laying the bending-resistant energy consuming steel bar 6 and the shearing-resistant high-strength steel bar 7: one end of the shearing-resistant high-strength steel bar 7 protruding into the prefabricated concrete column 1 and connecting to an internal-to-column anchoring steel bar 91 via a mechanical-connection connector 92, and the other end being laid at a position over the prefabricated beam 21 where the beam post-poured layer 22 is to be poured; and the bending-resistant energy consuming steel bar 6 being nested by a sleeve 63, one end protruding into the prefabricated concrete column 1 and connecting to an internal-to-column anchoring steel bar 91 via a mechanical-connection connector 92, and the other end being laid at a position over the shearing-resistant high-strength steel bar 7 where the beam post-poured layer 22 is to be poured.

The Third Embodiment

Figure 10:
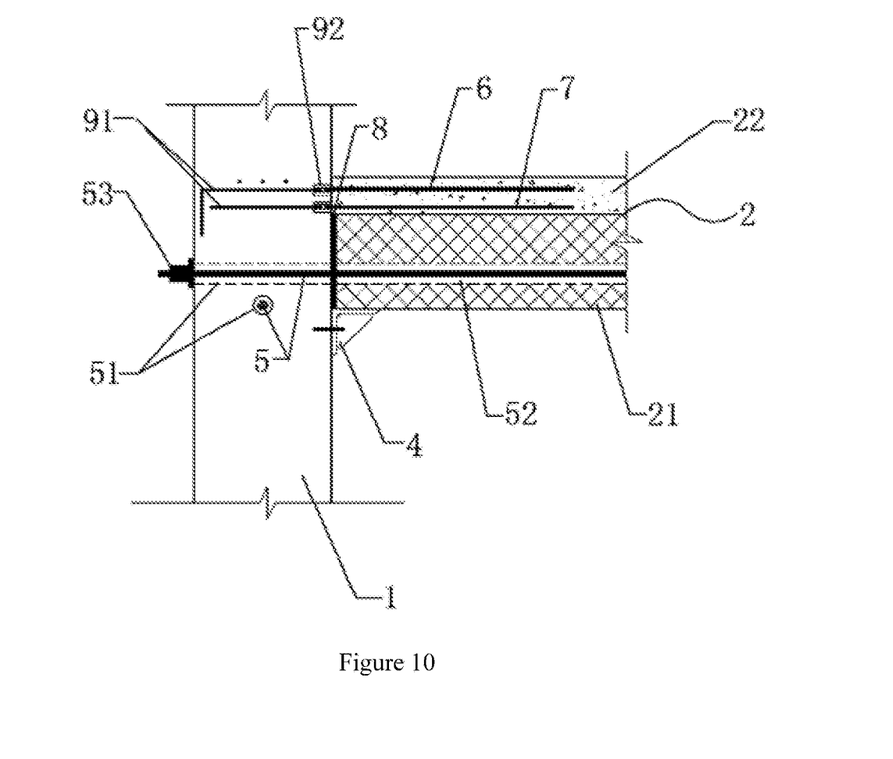
FIG. 10 is a schematic diagram of the A-A cross section in FIG. 2 of the third embodiment.

As shown in FIGS. 1, 2 and 10, the prestressed assembled concrete frame-joint connecting structure of the present disclosure comprises a prefabricated concrete column 1, a prefabricated concrete superposed beam 2, a composite slab 3, a post-tensioned prestressing tendon 5 that connects the prefabricated concrete column 1 and the prefabricated concrete superposed beam 2, and a bending-resistant energy consuming steel bar 6 and a shearing-resistant high-strength steel bar 7 that are located at a post-poured layer at the upper portion of the prefabricated concrete superposed beam 2. The beam post-poured layer 22 of the prefabricated concrete superposed beam 2 and the slab post-poured layer 32 of the composite slab 3 are integrally poured. The prefabricated concrete column 1 is a side column. The side wall of the prefabricated concrete column 1 is provided with a temporary support 4, the temporary support 4 is a corbel, and the opposite side supports the beam bottom of the prefabricated concrete superposed beam 2.

The prefabricated concrete superposed beam 2 comprises a prefabricated beam 21 at the lower portion and the beam post-poured layer 22 at the upper portion. A beam prestressing-tendon channel 52 is provided within the range of ⅓ from the middle portion to the lower portion of the cross section of the prefabricated beam 21 and in the length direction throughout the length of the prefabricated beam 21. The prefabricated concrete column 1 is provided with horizontally a column prestressing-tendon channel 51, and the column prestressing-tendon channel 51 matches with and corresponds to the beam prestressing-tendon channel 52. Column prestressing-tendon channels 51 that are not in the same straight line are staggered in the column height direction. The post-tensioned prestressing tendon 5 passes through sequentially the beam prestressing-tendon channel 52 and the column prestressing-tendon channel 51, and tensions and fastens the beam and the column by using a prestressing-tendon outer anchor head 53. The beam prestressing-tendon channel 52 and the column prestressing-tendon channel 51 are filled with a high-strength crack pouring binding material 8. The width of the beam-column seam between the prefabricated concrete superposed beam 2 and the prefabricated concrete column 1 is 10-30 mm. It is filled with the high-strength crack pouring binding material 8. The high-strength crack pouring binding material 8 is a high-strength quick-hardening-cement-based grouting material, a steel-fiber quick-hardening-cement-based grouting material or a polymer mortar that have a compressive strength above 45 MPa.

The bending-resistant energy consuming steel bar 6 is provided external to the column and is in the form of full adhesion. The bending-resistant energy consuming steel bar 6 has one end that protrudes into the prefabricated concrete column 1 and is connected to an internal-to-column anchoring steel bar 91 via a mechanical-connection connector 92, and the other end that is poured within the beam post-poured layer 22. The internal-to-column anchoring steel bar 91 is provided with an energy-consuming-steel-bar internal-to-column anchoring plate 93.

The shearing-resistant high-strength steel bar 7 is located under the bending-resistant energy consuming steel bar 6, is poured within the beam post-poured layer 22, and has one end that protrudes into the prefabricated concrete column 1 and is connected to an internal-to-column anchoring steel bar 91 via a mechanical-connection connector 92. The length of the shearing-resistant high-strength steel bar 7 that is poured within the beam post-poured layer 22 is not less than 15 times the diameter of a steel bar. The shearing-resistant high-strength steel bar 7 is made of HRB400, HRB500 or HRB600.

The method for constructing the prestressed assembled concrete frame-joint connecting structure of the present embodiment is similar to that of the first embodiment, and the differences are the Step 7 and the Step 8. The particular method is as follows:

Step 7: tensioning the post-tensioned prestressing tendon: firstly filling the high-strength crack pouring binding material 8 into the beam prestressing-tendon channel 52 and the column prestressing-tendon channel 51, and after a required strength has been reached, tensioning the post-tensioned prestressing tendon 5 by using the prestressing-tendon outer anchor head 53, and fixing; and Step 8: laying the bending-resistant energy consuming steel bar 6 and the shearing-resistant high-strength steel bar 7: one end of the shearing-resistant high-strength steel bar 7 protruding into the prefabricated concrete column 1 and connecting to an internal-to-column anchoring steel bar 91 via a mechanical-connection connector 92, and the other end being laid at a position over the prefabricated beam 21 where the beam post-poured layer 22 is to be poured; and one end of the bending-resistant energy consuming steel bar 6 protruding into the prefabricated concrete column 1 and connecting to an internal-to-column anchoring steel bar 91 via a mechanical-connection connector 92, and the other end being laid at a position over the shearing-resistant high-strength steel bar 7 where the beam post-poured layer 22 is to be poured.

The above-described embodiments are merely description on the preferable embodiments of the present disclosure, and are not limiting the scope of the present disclosure. All of the variations and improvements made to the technical solutions of the present disclosure by a person skilled in the art fall within the protection scope defined by the claims of the present disclosure without departing from the spirit of the present disclosure.

We claim:

1. A prestressed assembled concrete frame-joint connecting structure, comprising a prefabricated concrete column (1), a prefabricated concrete superposed beam (2) and a composite slab (3), wherein
   the prestressed assembled concrete frame-joint connecting structure further comprises a temporary support (4) and a post-tensioned prestressing tendon (5) that are provided under the joint, a energy consuming steel bar (6) and a steel bar (7), wherein the post-tensioned prestressing tendon (5) connects the prefabricated concrete column (1) and the prefabricated concrete superposed beam (2);
   a beam post-poured layer (22) of the prefabricated concrete superposed beam (2) and a slab post-poured layer (32) of the composite slab (3) are integrally poured;
   a beam-column seam between the prefabricated concrete superposed beam (2) and the prefabricated concrete column (1) is filled with a crack pouring binding material (8); and
   the energy consuming steel bar (6) and the steel bar (7) are laid into the beam post-poured layer (22) at an upper portion of the prefabricated concrete superposed beam (2), and the energy consuming steel bar (6) is located over the steel bar (7); and
   the energy consuming steel bar (6) is provided external to the column and is in a form of partial adhesion, and the energy consuming steel bar (6) has one end that protrudes into the prefabricated concrete column (1) and is connected to an internal-to-column anchoring steel bar (91) via a mechanical-connection connector (92), and the other end that is poured within the beam post-poured layer (22), and
   the energy consuming steel bar (6) is nested by a sleeve (63), the sleeve (63) has one end that clings to an outer side wall of the prefabricated concrete column (1), and a length of the sleeve (63) is 4-23 times a diameter of the energy consuming steel bar (6); and
   the energy consuming steel bar (6) within the sleeve (63) is a necking section (64), the necking section (64) has a cross-sectional area of 50-90% of a cross-sectional area of the energy consuming steel bar (6), and the necking section (64) extends from a position that has a distance to the mechanical-connection connector (92) of 1-3 times the diameter of the energy consuming steel bar (6) to a tail end of the sleeve (63).

2. The prestressed assembled concrete frame-joint connecting structure according to claim 1, wherein
   the prefabricated concrete superposed beam (2) comprises a prefabricated beam (21) at a lower portion and the beam post-poured layer (22) at the upper portion, and a beam prestressing-tendon channel (52) is provided within a range of ⅓ from a middle portion to a lower portion of a cross section of the prefabricated beam (21) and in a length direction throughout a length of the prefabricated beam (21);
   the prefabricated concrete column (1) is provided with horizontally a column prestressing-tendon channel (51), and the column prestressing-tendon channel (51) matches with and corresponds to the beam prestressing-tendon channel (52);
   the post-tensioned prestressing tendon (5) passes through sequentially the beam prestressing-tendon channel (52) and the column prestressing-tendon channel (51), and tensions and fastens the beam and the column by using a prestressing-tendon outer anchor head (53); and
   column prestressing-tendon channels (51) that are not in a same straight line are staggered in a column height direction.

3. The prestressed assembled concrete frame-joint connecting structure according to claim 1, wherein a width of the beam-column seam between the prefabricated concrete superposed beam (2) and the prefabricated concrete column (1) is 10-30 mm.

4. The prestressed assembled concrete frame-joint connecting structure according to claim 1, wherein the crack pouring binding material (8) is one or more of a cement-based grouting material, a fiber cement-based grouting material or a polymer mortar material that have a compressive strength above 45 MPa.

5. The prestressed assembled concrete frame-joint connecting structure according to claim 1, wherein the steel bar (7) has one end that protrudes into the prefabricated concrete column (1) and is connected to an internal-to-column anchoring steel bar (91) via a mechanical-connection connector (92), and one end that is poured within the beam post-poured layer (22), and a length of the steel bar (7) that is poured within the beam post-poured layer (22) is not less than 15 times a diameter of a steel bar.

6. The prestressed assembled concrete frame-joint connecting structure according to claim 1, wherein the energy consuming steel bar (6) is provided internal to the column and is in a form of no adhesion, an energy-consuming-steel-bar channel (61) is provided horizontal within the prefabricated concrete column (1), and the energy consuming steel bar (6) passes through the energy-consuming-steel-bar channel (61), and has one end that protrudes out of an outer side of the prefabricated concrete column (1) and is connected to the prefabricated concrete column (1) via an external-to-column anchoring plate (62), and the other end that is poured within the beam post-poured layer (22).

7. The prestressed assembled concrete frame-joint connecting structure according to claim 1, wherein a cross-sectional shape of the necking section (64) is round or an shape, the shape is formed by combining two mutually parallel straight lines and two symmetrical circular arcs, a radius of a circle where the circular arcs are in is equal to a radius of the energy consuming steel bar (6), and a central angle of the circular arcs is 50-70°.

8. The prestressed assembled concrete frame-joint connecting structure according to claim 1, wherein the energy consuming steel bar (6) is provided external to the column and is in a form of full adhesion, and the energy consuming steel bar (6) has one end that protrudes into the prefabricated concrete column (1) and is connected to an internal-to-column anchoring steel bar (91) via a mechanical-connection connector (92), and the other end that is poured within the beam post-poured layer (22).

9. A method for constructing the prestressed assembled concrete frame-joint connecting structure, comprising a prefabricated concrete column (1), a prefabricated concrete superposed beam (2) and a composite slab (3), wherein
the prestressed assembled concrete frame-joint connecting structure further comprises a temporary support (4) and a post-tensioned prestressing tendon (5) that are provided under the joint, a energy consuming steel bar (6) and a steel bar (7), wherein the post-tensioned prestressing tendon (5) connects the prefabricated concrete column (1) and the prefabricated concrete superposed beam (2);
a beam post-poured layer (22) of the prefabricated concrete superposed beam (2) and a slab post-poured layer (32) of the composite slab (3) are integrally poured;
a beam-column seam between the prefabricated concrete superposed beam (2) and the prefabricated concrete column (1) is filled with a crack pouring binding material (8); and
the energy consuming steel bar (6) and the steel bar (7) are laid into the beam post-poured layer (22) at an upper portion of the prefabricated concrete superposed beam (2), and the energy consuming steel bar (6) is located over the steel bar (7); and
the energy consuming steel bar (6) is provided external to the column and is in a form of partial adhesion, and the energy consuming steel bar (6) has one end that protrudes into the prefabricated concrete column (1) and is connected to an internal-to-column anchoring steel bar (91) via a mechanical-connection connector (92), and the other end that is poured within the beam post-poured layer (22); and
the energy consuming steel bar (6) is nested by a sleeve (63), the sleeve (63) has one end that clings to an outer side wall of the prefabricated concrete column (1), and a length of the sleeve (63) is 4-23 times a diameter of the energy consuming steel bar (6); and
the energy consuming steel bar (6) within the sleeve (63) is a necking section (64), the necking section (64) has a cross-sectional area of 50-90% of a cross-sectional area of the energy consuming steel bar (6), and the necking section (64) extends from a position that has a distance to the mechanical-connection connector (92) of 1-3 times the diameter of the energy consuming steel bar (6) to a tail end of the sleeve (63); wherein the method comprises the following steps:
installing the temporary support: according to a design scheme, installing the temporary support (4) on the prefabricated concrete column (1);
installing the prefabricated concrete column: in a hoisting process, adjusting a perpendicularity of the prefabricated concrete column (1) by using the temporary support (4);
installing the concrete superposed beam: hoisting the prefabricated beam (21), and fixing the prefabricated beam (21) over the temporary support (4);
installing the composite slab: hoisting a prefabricated slab (31) of the composite slab (3), and fixing the prefabricated slab (31) to the prefabricated beam (21);
installing the post-tensioned prestressing tendon: laying the post-tensioned prestressing tendon (5) into the prefabricated concrete column (1) and the prefabricated beam (21) of the prefabricated concrete superposed beam (2);
filling the beam-column seam: filling the high-strength crack pouring binding material (8) into the beam-column seam between the prefabricated concrete superposed beam (2) and the prefabricated concrete column (1), wherein a width of the beam-column seam is 10-30 mm;
tensioning the post-tensioned prestressing tendon: after the binding material within the beam-column seam has reached a required strength, tensioning the post-tensioned prestressing tendon (5), and fixing;
laying the bending-resistant energy consuming steel bar and the shearing-resistant high-strength steel bar: laying the bending-resistant energy consuming steel bar (6) and the shearing-resistant high-strength steel bar (7) at a position of the prefabricated concrete superposed beam (2) where the beam post-poured layer (22) is to be poured, and connecting one end of the bending-resistant energy consuming steel bar (6) and one end of the shearing-resistant high-strength steel bar (7) to the prefabricated concrete column (1); and
pouring the post-poured layers: integrally pouring the beam post-poured layer (22) of the prefabricated concrete superposed beam (2) and the slab post-poured layer (32) of the composite slab (3) in site, and after the poured concrete structure has reached a required strength, performing maintenance.

\* \* \* \* \*